(12) United States Patent
Shaw et al.

(10) Patent No.: US 9,516,176 B2
(45) Date of Patent: Dec. 6, 2016

(54) LONG TERM EVOLUTION NETWORK BILLING MANAGEMENT

(75) Inventors: Venson M. Shaw, Kirkland, WA (US); Gholam-Reza Rahsaz, Sammamish, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 78 days.

(21) Appl. No.: 13/485,342

(22) Filed: May 31, 2012

(65) Prior Publication Data

US 2013/0322268 A1 Dec. 5, 2013

(51) Int. Cl.
*H04M 15/00* (2006.01)
*H04L 12/24* (2006.01)

(52) U.S. Cl.
CPC .......... *H04M 15/82* (2013.01); *H04L 41/5029* (2013.01); *H04M 15/80* (2013.01); *H04M 15/8016* (2013.01); *H04M 15/8027* (2013.01); *H04M 15/81* (2013.01); *H04M 15/8228* (2013.01); *H04M 15/83* (2013.01); *H04M 15/85* (2013.01); *H04M 15/851* (2013.01)

(58) Field of Classification Search
CPC .............. H04L 12/14–12/1496; H04L 47/10; H04L 47/30; H04L 47/11; H04L 47/15; H04L 47/35; H04L 12/64; H04L 65/102; H04L 2012/64; H04L 2012/5629; H04L 49/255; H04L 47/70; H04L 47/24; H04L 41/5029; H04W 84/18; H04W 84/12; H04W 72/04; H04W 88/08; H04W 72/0453; H04M 15/82; H04M 15/80; H04M 15/8016; H04M 15/8027; H04M 15/81; H04M 15/8228; H04M 15/83; H04M 15/85; H04M 15/851

USPC ....... 370/252, 229, 230, 235, 310, 329, 352, 370/395.21, 395.2, 395.4; 455/418, 452.2, 455/452.1, 509, 406, 405, 461, 432.2; 709/223, 232

See application file for complete search history.

(56) References Cited

U.S. PATENT DOCUMENTS

| | | | |
|---|---|---|---|
| 8,095,147 B2 * | 1/2012 | Ahlgren | 455/456.1 |
| 8,208,896 B2 * | 6/2012 | Li et al. | 455/406 |
| 8,532,090 B1 * | 9/2013 | Petit-Huguenin et al. | 370/352 |
| 2002/0188710 A1 * | 12/2002 | Duffield et al. | 709/223 |
| 2006/0224402 A1 * | 10/2006 | Hanna et al. | 705/1 |
| 2007/0072605 A1 * | 3/2007 | Poczo | 455/432.2 |
| 2009/0280770 A1 * | 11/2009 | Mahendran | 455/404.1 |
| 2009/0290688 A1 * | 11/2009 | Peters et al. | 379/37 |
| 2010/0048161 A1 * | 2/2010 | He et al. | 455/404.1 |
| 2010/0255808 A1 * | 10/2010 | Guo et al. | 455/404.1 |
| 2011/0158223 A1 * | 6/2011 | Liu et al. | 370/352 |

(Continued)

OTHER PUBLICATIONS

Hogue, Nathan. "Service Level Agreements with Penalty Clause." South Carolina State Library State Documents (Aug. 2009).*

*Primary Examiner* — Michael Thier
*Assistant Examiner* — Eric Myers
(74) *Attorney, Agent, or Firm* — Baker & Hostetler LLP

(57) ABSTRACT

A device in a network may monitor a communications session (such as a traffic flow) and determine that the session has been affected by an adverse network condition such as equipment failure or heavy congestion. The effect of the network condition may be provided to a billing system that may proactively adjust charging for a customer associated with the traffic flow. Various data may be taken into account in determining the adjustment, including a service type, a subscriber identifier, an emergency identifier, and a traffic condition index.

20 Claims, 11 Drawing Sheets

(56) References Cited

U.S. PATENT DOCUMENTS

| | | | |
|---|---|---|---|
| 2011/0199932 A1* | 8/2011 | Short et al. | 370/252 |
| 2011/0238547 A1* | 9/2011 | Belling et al. | 705/34 |
| 2011/0281548 A1* | 11/2011 | Liang et al. | 455/404.1 |
| 2011/0319054 A1* | 12/2011 | Cutler et al. | 455/406 |
| 2012/0064908 A1* | 3/2012 | Fox et al. | 455/452.2 |
| 2012/0099592 A1* | 4/2012 | Ludwig | 370/392 |
| 2013/0005322 A1* | 1/2013 | Raleigh | 455/418 |
| 2013/0272144 A1* | 10/2013 | Dong et al. | 370/252 |
| 2013/0326061 A1* | 12/2013 | Li | 709/224 |

* cited by examiner

LONG TERM EVOLUTION NETWORK BILLING MANAGEMENT

TECHNICAL FIELD

The technical field generally relates to wireless communications and more specifically relates to charging management in long term evolution (LTE) networks.

BACKGROUND

In current wireless networks, such as long term evolution (LTE) networks, a customer operating a wireless mobile device may receive service from a wireless network for which the customer is then billed, or for which the customer has paid in advance (e.g., prepaid service). While the customer is operating the wireless mobile device, the service the customer receives may be adversely affected by network conditions such as outages and heavy congestion. Despite this, in the current state of the art, the customer is typically billed for the service, either at a later time or against a prepaid account, at the same rate at which the customer would be billed even if there was no service degradation. This may lead the customer to be dissatisfied with the service, which may in turn lead to cancellation of service, an increase in the churn rate for the wireless network provider, and an increase in poor reviews and word-of-mouth for the provider.

In many wireless networks, a customer may be charged on a per-flow basis, often based on Internet Protocol (IP) flows of data between a customer's wireless mobile device and a wireless network. Identifiers may be used by the wireless network provider to identify each flow and then charge for the flow. Here again, in the current state of the art, each flow is typically charged at the same rate regardless of the quality of service provided for the respective flow. This may not accurately represent the value of the service received by the customer because each flow may be affected differently by network conditions and equipment due to, for example, outages and heavy congestion. Thus, one flow may provide faster communications between the customer's wireless mobile device while another flow may provide slower communications, but both flows would be billed to the customer at the same rate. This also may lead to customer dissatisfaction, cancellation of service, increased churn rate, and a lowering of the reputation of the provider.

SUMMARY

A communications session (such as a traffic flow) is monitored and it is determined that the session has been affected by an adverse network condition, such as equipment failure or heavy congestion, for example. The effect of the network condition may be provided to a billing system that may proactively adjust charging for a customer associated with the traffic flow. Various data associated with the session and/or contained in packets of the session may be used to determine the subscriber associated with the session, such as a 5-tuple and a subscriber identifier. Various data may be taken into account in determining the charging adjustment, including a service type, a subscriber identifier, an emergency identifier, and a traffic condition index. A notification may be transmitted to the subscriber notifying the subscriber that a charging adjustment has been requested and/or made.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1A:
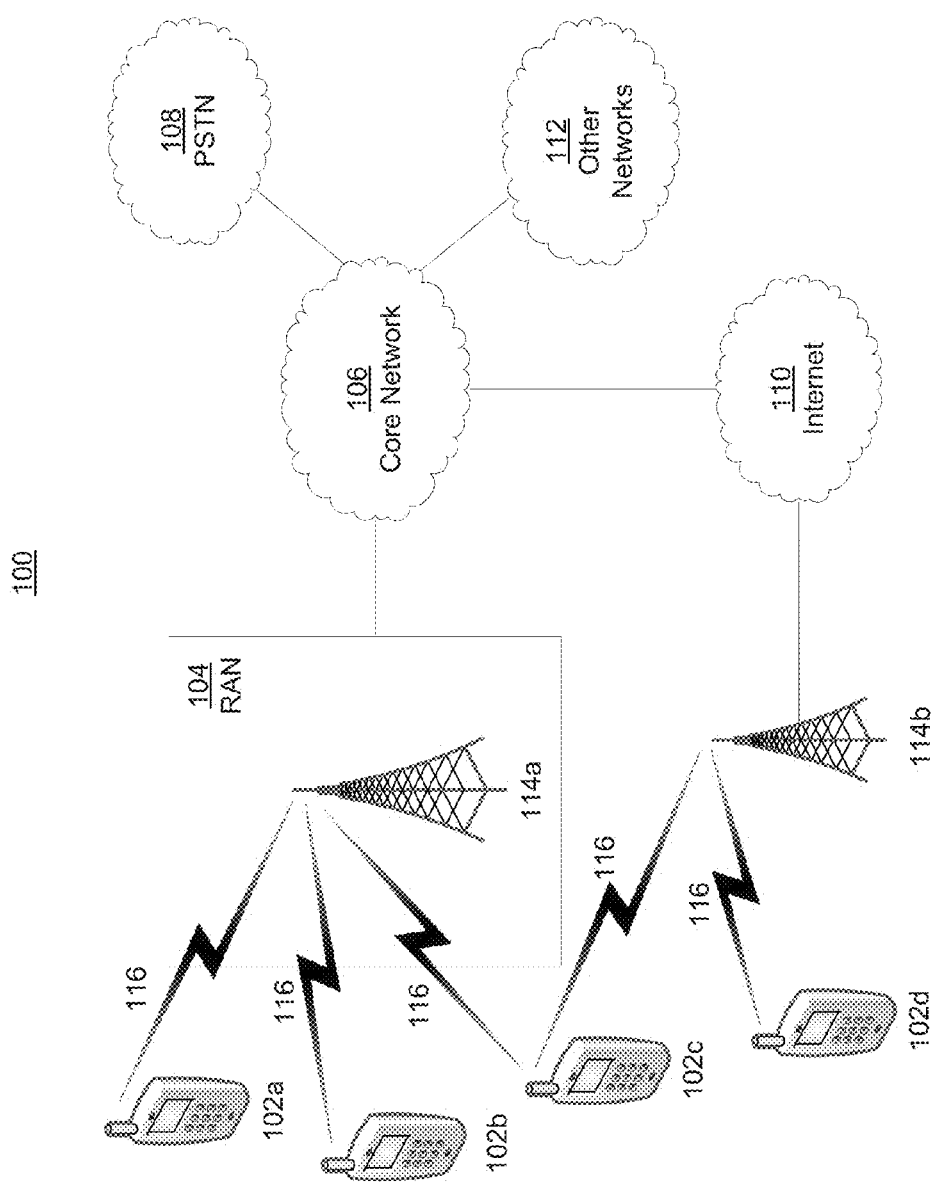
FIG. 1A is a system diagram of an example communications system in which LTE network billing management may be implemented.

FIG. 1A is a diagram of an example communications system 100 in which LTE network billing management may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. A communications system such as that shown in FIG. 1A may also be referred to herein as a network.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102*d* may be any type of device configured to operate and/or communicate in a wireless environment. By way of example, the WTRUs 102*a*, 102*b*, 102*c*, 102*d* may be configured to transmit and/or receive wireless signals and may include user equipment (UE), a mobile station, a mobile device, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114*a* and a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the core network 106, the Internet 110, and/or the networks 112. By way of example, the base stations 114*a*, 114*b* may be a base transceiver station (BTS), a Node-B, an eNode B, a Home Node B, a Home eNode B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, etc. The base station 114*a* and/or the base station 114*b* may be configured to transmit and/or receive wireless signals within a particular geographic region, which may be referred to as a cell (not shown). The cell may further be divided into cell sectors. For example, the cell associated with the base station 114*a* may be divided into three sectors. Thus, in an embodiment, the base station 114*a* may include three transceivers, i.e., one for each sector of the cell. In another embodiment, the base station 114*a* may employ multiple-input multiple output (MIMO) technology and, therefore, may utilize multiple transceivers for each sector of the cell.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA) that may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114*a* and the WTRUs 102*a*, 102*b*, 102*c* may implement radio technologies such as IEEE 802.16 (i.e., Worldwide Interoperability for Microwave Access (WiMAX)), CDMA2000, CDMA20001x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*b* may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102*a*, 102*b*, 102*c*, 102*d*. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114b, which may employ an IEEE 802 radio technology.

Figure 1B:
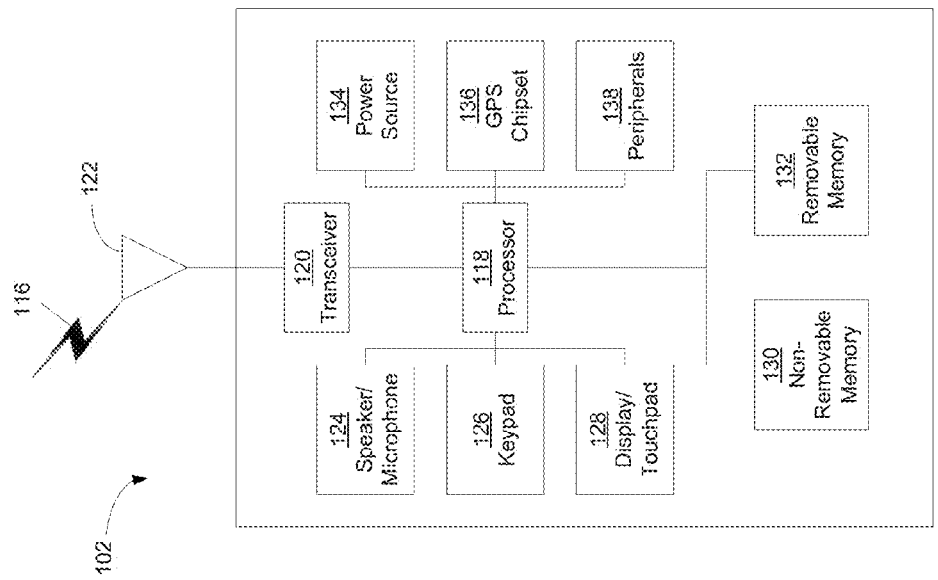
FIG. 1B is a system diagram of an example mobile device (also referred to as a wireless transmit/receive unit (WTRU) and/or as user equipment (UE)) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
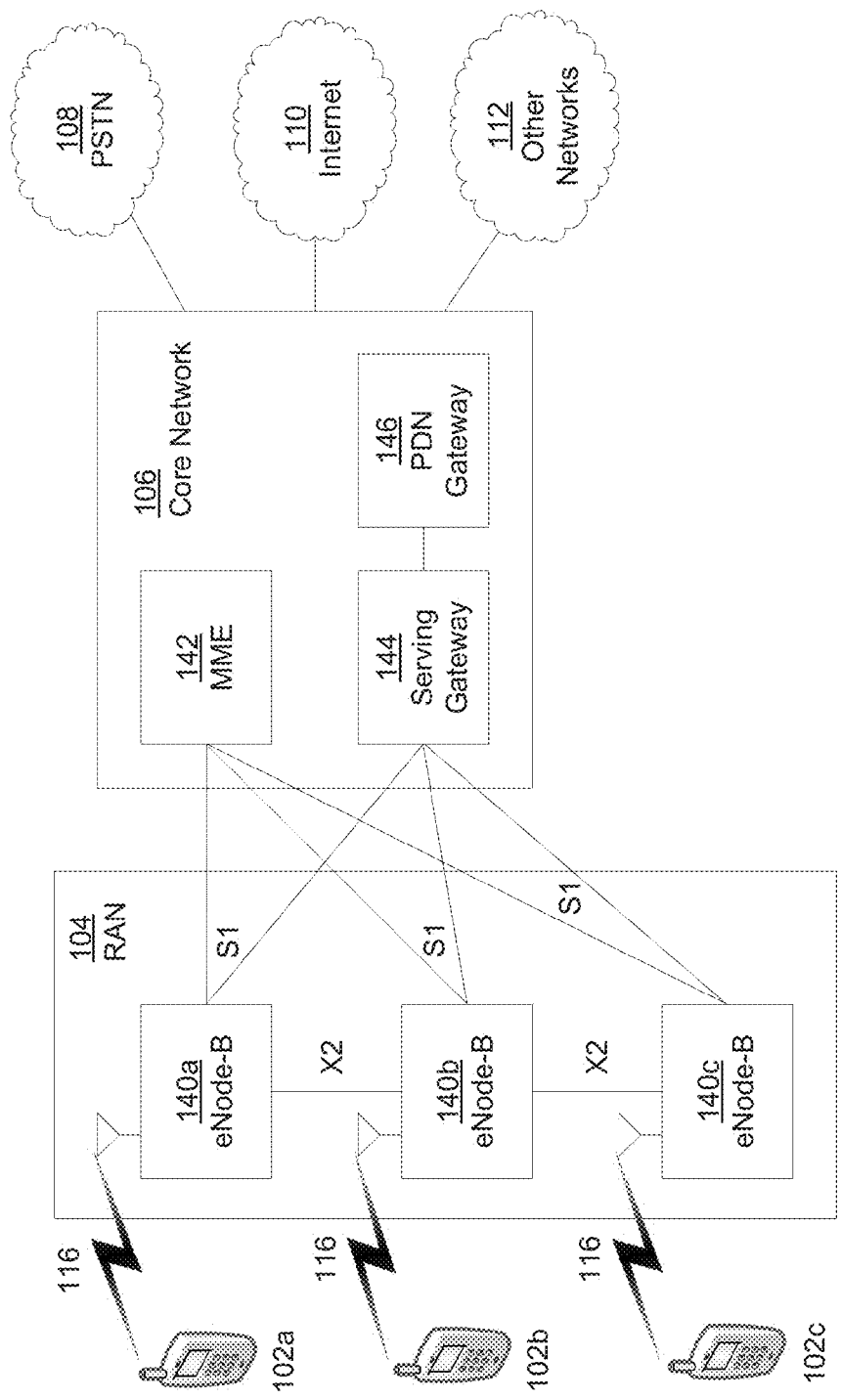
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, and 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, and 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway or entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, and 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2:
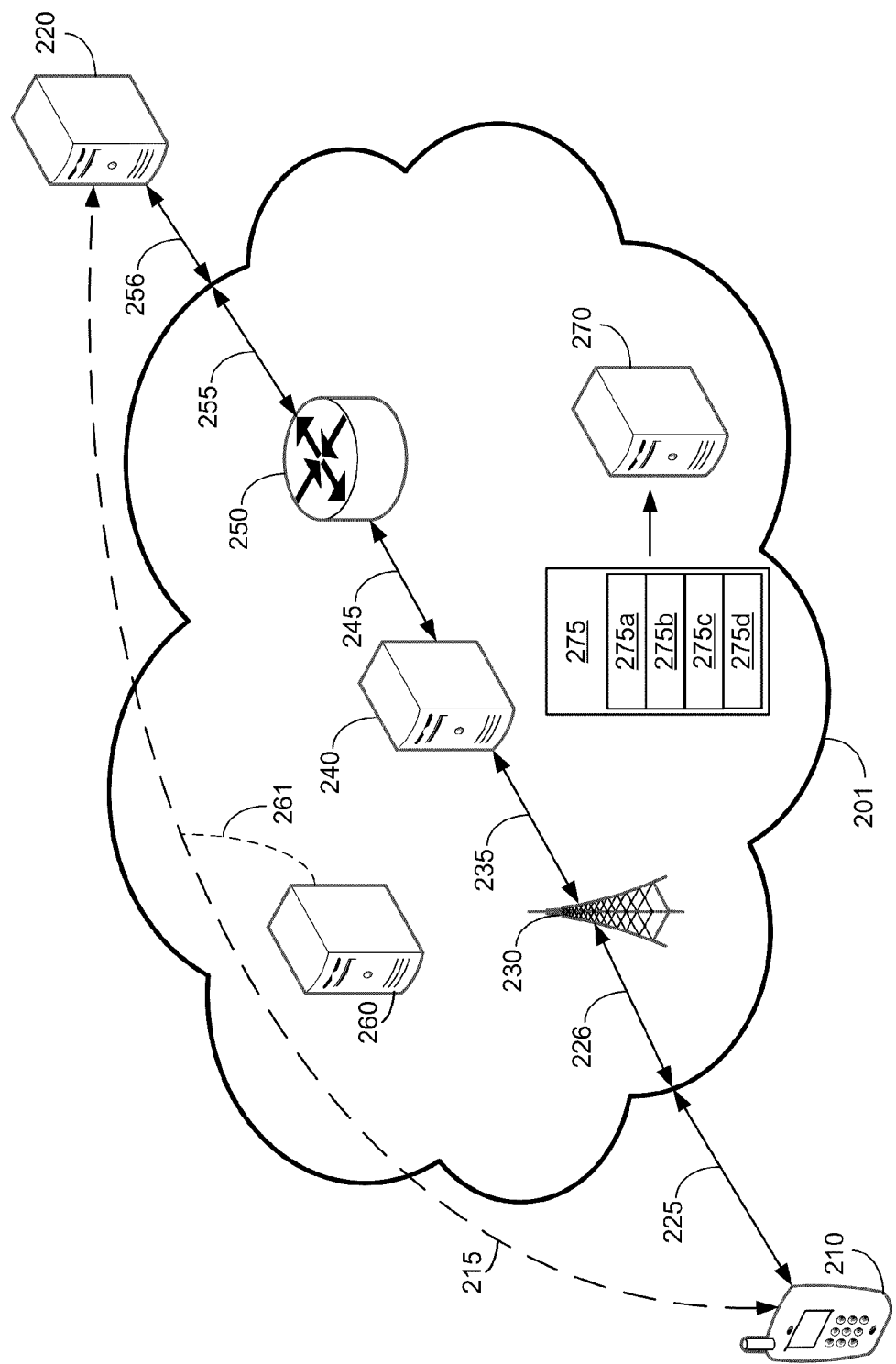
FIG. 2 illustrates a non-limiting exemplary network in which LTE network billing management may be implemented.

FIG. 2 illustrates an exemplary network configuration and signal flow that may be used in an embodiment. Mobiles device 210, operated by a customer of a provider of network 201, may be engaged in communications session 215 with device 220 using network 201. Communications session 215 may be any logical communications session of any type, including a portion of or an entire IP flow. Mobile device 210 may be any type of wireless communications device, including a UE, a WTRU, or any other communications device as disclosed herein, or any other type of device capable of being configured to perform the functions and features of the present disclosure. Network 201 may be any type of communications network, including a wireless network, a wired network, and a combination thereof, implementing any number and type of communications protocols and technologies. Device 220 may be any type of computing device or any number or combination of such devices, and may provide data, content, or any other service to mobile device 210. Device 220 may also be another mobile communications device, including any such device disclosed herein, and may be operated by a customer or other user. All such embodiments are contemplated as within the scope of the present disclosure.

The actual physical path taken to implement communications session 215 may vary and may include any number of devices and systems that may be configured to process, transmit, and/or receive data communicated via communications session 215. The example devices and physical paths shown in FIG. 2 are exemplary and used merely for purposes of explaining the present subject matter. As one skilled in the art will recognize, many physical paths may be used for a communications session, and many and varied devices may be involved in implementing such a session. No limitation on the number and type of devices involved in setting up, maintaining, and/or tearing down a communications session should be implied from FIG. 2 or the description thereof.

Traffic between mobile device 210 and device 220 may traverse a path that includes links 225, 226, 235, 245, 255, and/or 256. Each of these links may be wired or wireless, logical or physical, and may use any means for facilitating data transport across each respective link. Connecting these links may be devices 230, 240, and/or 250, as well as any other devices. Each of these devices may serve a particular function or be a particular device within a wireless network, such as a base station, an eNodeB, a serving gateway (SGW), a packet data network (PDN) gateway (PGW), an HSS, an MMS, a router, a cell tower, a gateway, a proxy server, or any other device that performs any other function or combination of functions that may be present in a wireless network.

Any of links 225, 226, 235, 245, 255, and/or 256 may experience congestion that affects the implementation and maintenance of communications session 215. Alternatively, or in addition, any of devices 230, 240, and/or 250 may fail or otherwise experience a malfunction that does not allow the device to operate properly or causes the device to operate sub-optimally. In such events, the service provided to mobile device 210 for communications session 215, and in some embodiments for any other communications sessions, may be degraded. Thus, the customer operating device 210 may experience poor service when interacting with network 201.

In an embodiment, service degradation of communications session 215, or of any other or all communications sessions in which mobile device 210 may be involved, may be detected by one or more devices in network 201. For example, any of devices 220, 230, 240, and 250 may determine that the service provided to mobile device 210 has been degraded. Alternatively, a device, server, or component of network 201, such as device 260, or a software program executing on any device of network 201, such as device 260, may be dedicated to determining service degradation for one or more mobile devices, such as mobile device 210. Device 260 may have a logical connection 261 that interfaces with and/or facilitates gathering data regarding communications session 215. Using the data collected about communications session 215, device 260 and/or software executing thereon may determine that mobile device 210 is experiencing service degradation in regard to communications session 215. Note that device 260 and/or software executing thereon may, instead or in addition to, determine that mobile device 210 is experiencing service degradation in regard to one or more other communications session or generally.

Upon determining that some service degradation has occurred, any of the devices 220, 230, 240, 250, or 260 may characterize the service degradation in order to determine if any charging adjustment should be performed. In an embodiment, the service degradation may be ranked (e.g., mild, medium, severe), based on a measure of the service degradation. The measure of service degradation may be any measurement as known to those skilled in the art, such as a difference of throughput to expected throughput, a percentage of packet loss, etc., or any combination of measurements. The measure made may be compared to thresholds in order to determine the appropriate ranking of service degradation in a spectrum of service degradation categories. Such a spectrum may include any number of discrete categories of service degradation (e.g., none, mild, medium, severe). Alternatively, the characterization of service degradation may be more granular, such as being an actual measure of service degradation such as a difference of throughput to expected throughput, a percentage of packet loss, etc. Note that in an alternate embodiment, all traffic in communications session 215 may be ranked. That is, all traffic may be ranked and only traffic that is determined to be degraded may be processes for charging adjustment as disclosed herein. In such an embodiment, rankings may include a category representing normal service (e.g., normal).

Upon determining and categorizing service degradation, steps may be taken to adjust the charging to the customer of mobile device 210 accordingly. In an embodiment, indication 275 of the service degradation may be transmitted to a billing server, such as server 270 that may be in network 201 and communicatively connected to one or more of devices 220, 230, 240, 250, or 260 (connection(s) not shown in FIG. 2). Indication 275 may include any information that may facilitate identifying communications session 215 and/or mobile device 210 such that the correct customer associated with mobile device 210 may have his or her bill adjusted accordingly. In an embodiment, the customer's bill may be adjusted based on the severity of the service degradation (e.g., more degraded service, more of a reduction in the bill). Alternatively, the customer's bill may simply be credited one amount for each instance of service degradation or for each communications session that is affected by service degradation. Such amounts may be adjusted (e.g., increased) as more instances of service degradation are recorded. Any other method or means of determining an adjustment based on service degradation are contemplated as within the scope of the present disclosure.

In an embodiment, the customer operating mobile device 210 may be notified of the adjustment using any means, including an email, a text message, a notice provided in a paper or electronic bill, etc. The customer may also be notified that a request has been made for a billing adjustment.

In an alternative embodiment, rather than a network device of network 201 determining that service degradation has occurred, mobile device 210 may perform the determination. In such an embodiment, service degradation of communications session 215, or of any other or all communications sessions in which mobile device 210 may be involved, may be detected by mobile device 210. Upon determining that some service degradation has occurred, mobile device 210 may characterize the service degradation in order to determine if any charging adjustment should be performed. Such characterization may use any means or methods, including those set forth herein. Upon determining and categorizing the service degradation, mobile device 210 may transmit indication 275 of the service degradation to server 270 so that the account of the customer operating mobile device 210 may be adjusted accordingly. In such embodiments, the customer operating mobile device 210 may be notified of the adjustment using any means, including an email, a text message, a notice provided in a paper or electronic bill, etc. The customer may also be notified by mobile device 210 that a request has been made for a billing adjustment.

In order to identify a communications session (e.g., a traffic flow) such as communications session 215, a combination of identifying data may be used. In an embodiment, communications session 215 may be identified by the source IP address of mobile device 210, the destination IP address of device 220, a protocol in use in the session (e.g., the protocol in use in a higher layer than IP, such as transmission control protocol (TCP), user datagram protocol (UDP), or generic routing encapsulation (GRE), or a protocol in use at the Internet layer other than IP, such as Internet control message protocol (ICMP)), and a source port and a destination port for the identified protocol. This combination of identifying data may be referred to as a 5-tuple. Because each packet in a flow such as communications session 215 will have the same 5-tuple, the 5-tuple may be used to identify the flow itself and to identify packets as part of the flow. Using the 5-tuple, network 201, and devices therein, may track and account for all packets in a flow and thereby provide billing based on flows, including adjusting charging when a flow experiences service degradation.

In an embodiment, additional data may be included with a 5-tuple to identify flows, such as communications session 215 and packets within them. Such data may be used in any indicators, such as indicator 275, and may otherwise be obtained and used to determine charging and/or to determine whether and how to adjust charging for a customer based on the service experiences by a flow such as communications session 215.

In an embodiment, traffic control index (TCI) 275a may be used to identify a particular communications session (e.g., traffic flow), such as communications session 215, and/or packets within such a session. TCI 275a may be an indicator of one or more traffic conditions encountered by communications session 215 and/or packets contained therein. TCI 275a may be set and/or altered by any device across which communications session 215 traverses, such as any of devices 210, 220, 230, 240, 250, or 260. TCI 275a may take any form, such as a numerical representation of traffic conditions that may be correlated with defined traffic conditions. For example, TCI 275a may be a number from 0 to 7 (e.g., three bit binary number) where 0 indicates the best traffic condition and 7 indicates the worst. Any other method or means of defining and reporting traffic condition(s) are contemplated as within the scope of the present disclosure. TCI 275a may be used by a billing server or system, or by any other devices, to determine how to bill a customer and/or whether to adjusting billing based on traffic conditions experienced by a traffic flow such as communications session 215.

In an embodiment, service identifier (service ID) 275b may be used to identify the service being provided via communications session 215. For example, real-time services, such as voice communications or video conferencing, may be identified differently than non-real-time services, such as web browsing and email data transport. A particular number or set of binary digits maybe assigned to various services, or a single bit or a few bots may be set simply to indicate whether the service is real-time or non-real-time. Any other method or means of defining and reporting a service being provided by a traffic flow are contemplated as within the scope of the present disclosure. By identifying the service being provided by a traffic flow such as communications session 215, service ID 275b may be used by a billing server or system, or by any other devices, to determine how to bill a customer and/or whether to adjusting billing based on the service being provided by a traffic flow such as communications session 215. For example, real-time services may be billed at a higher rate than non-real-time services. Alternatively, or in addition, disruption of a real-time service by adverse traffic conditions affecting a traffic flow may result in more significant charging adjustments than disruption of non-real-time service.

In an embodiment, subscriber identifier (sub ID) 275c may be used to indicate a subscriber identity and/or a priority level that is to be ascribed to a communications session associated with a subscriber. Thus, sub ID 275c may be an identifier of a particular subscriber that may be used to determine a priority level to be ascribed to communications sessions for that subscriber, or sub ID 275c may be a priority ascribed to the communications session. A combination of these is also contemplated. For example, a subscriber may be identified by a binary number that also includes one or more particular bits being set to a particular value that indicates the subscriber's priority level (e.g., high priority subscriber numbers all have "11" as terminal digits, any other terminal digits indicate non-high priority or another priority ("10" may indicate medium priority, "01" may indicate low priority, etc.)). Any means or methods of indicating a subscriber and/or a priority associated with a subscriber may be used, and all such embodiments are contemplated as within the scope of the present disclosure. Sub ID 275c may be used by a billing server or system, or by any other devices, to determine how to bill a customer and/or whether to adjusting billing based on the service being provided by a traffic flow such as communications session 215. For example, a high priority subscriber may be billed at a higher rate than lower priority subscribers, while any disruption of traffic by adverse traffic conditions affecting a traffic flow of a high priority subscriber may result in more significant charging adjustments than disruption of a traffic flow of a lower priority subscriber.

In an embodiment, emergency identifier (emergency ID) 275d may be used to indicate an urgency that is to be ascribed to a communications session. Thus, emergency ID 275d may be an identifier of a particular level of urgency to be ascribed to communications session 215. Emergency ID 275d may be a number within a range of numbers where a higher number indicates higher urgency and a lower number indicates lower or no urgency. Alternatively, emergency ID 275d may be a single bit that indicates an emergency communications session if set and non-emergency communications session if not set. Any means or methods of indicating urgency or emergency status may be used, and all such embodiments are contemplated as within the scope of the present disclosure. Emergency ID 275d may be used by a billing server or system, or by any other devices, to determine how to bill a customer and/or whether to adjusting billing based on the service being provided by a traffic flow such as communications session 215. For example, an emergency or urgent communications session may be billed at a different rate than non-emergency or lower urgency communications sessions, while any disruption of emergency or urgent traffic by adverse traffic conditions may result in more significant charging adjustments than disruption of a traffic flow of non-emergency or lower urgency traffic.

Any combination of, or any individual, TCI 275a, service ID 275b, sub ID 275c, and emergency ID 275d may be used in a network such as network 201 for further identifying traffic flows, ensuring appropriate charging, and adjusting charging. Such data may be transmitted to billing server 270 by any device within network 201. Server 270 may then use such data to charge a customer and/or adjust charges for a customer.

Figure 3:
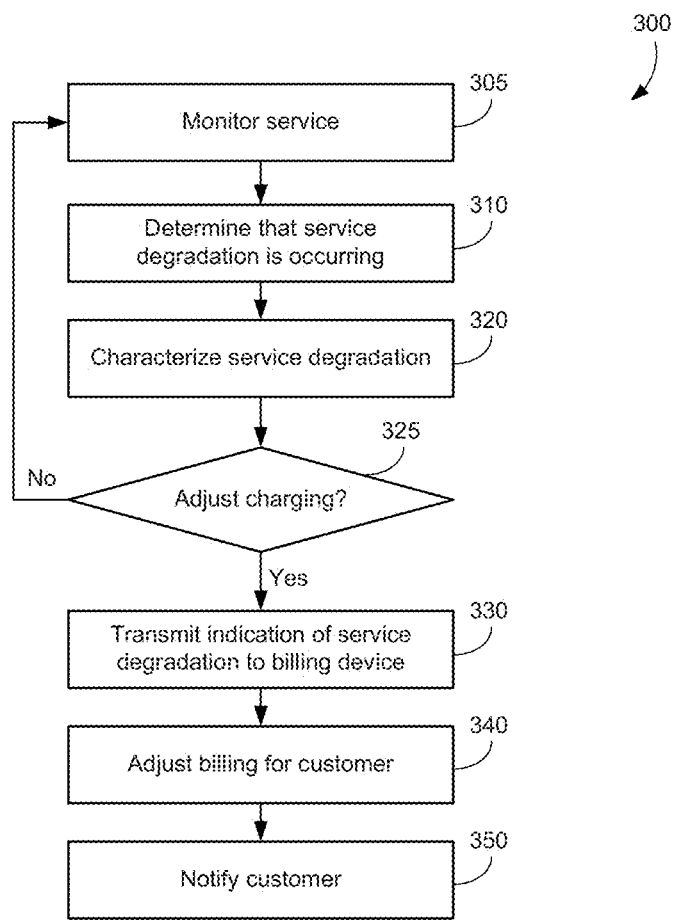
FIG. 3 illustrates a non-limiting exemplary method of implementing LTE network billing management.

FIG. 3 illustrates exemplary, non-limiting method 300 of implementing an embodiment as disclosed herein. Method 300, and the individual actions and functions describing in method 300, may be performed by any one or more devices, including those described herein. Note that any of the functions and/or actions described in regard to any of the blocks of method 300 may be performed in any order, in isolation, with a subset of other functions and/or actions described in regard to any of the other blocks of method 300 or any other method described herein, and in combination with other functions and/or actions, including those described herein and those not set forth herein. All such embodiments are contemplated as within the scope of the present disclosure.

At block 305, service of one or more communications sessions, or for a mobile device generally, is monitored. At block 310, based on the monitoring, a determination that service degradation is or has been occurring may be made. At block 320, such degradation may be characterized (e.g., ranked, categorized, etc.). Note that block 320 and 310 may be interchanged in some embodiments, for example, service may be characterized and, based on such characterization, a determination of whether the service is degraded may be made.

At block 325, a determination may be made as to whether the service degradation, as characterized, should cause an adjustment in a customer's bill. If not, monitoring of the service continues at block 305. If so, at block 330 an indication of the service degradation, in an embodiment including the characterization of the service degradation, may be transmitted to a billing device. Alternatively, the determination of block 325 may be performed at a billing device. In such an embodiment, the characterization and/or indication of service degradation may be transmitted to the billing device from the device that determined and/or characterized the service degradation, and the billing device may then determine, based on the indication, whether the customer's bill should be adjusted. In yet another embodiment, a billing device may receive a report or indication of a state of service for a mobile device or one or more communications sessions, and the billing device may then characterize the service degradation (if any) and may also determine whether any charging adjustment should be instituted and the type and/or amount of such a charging adjustment. Any other permutation or variation of devices and interactions thereof may be used to determine, characterize, and/or adjust charging for service degradation, and all such embodiments are contemplated as within the scope of the present disclosure.

At block 340, charging for the affected customer may be adjusted, in an embodiment based on the severity of the degradation. At block 350, the customer may be notified of the adjustment using any means or methods. Note that the customer may also be notified at any point in this process of the activities taking place. For example, upon determining that a service degradation may result in a charging adjustment, the customer may be notified that a request for charging adjustment or an indication of service degradation has been provided to a billing system, and then informed of the adjustment when and if it takes place. Any other notifications may be provided to the customer, and all such notifications are contemplated as within the scope of the present disclosure.

Figure 4:
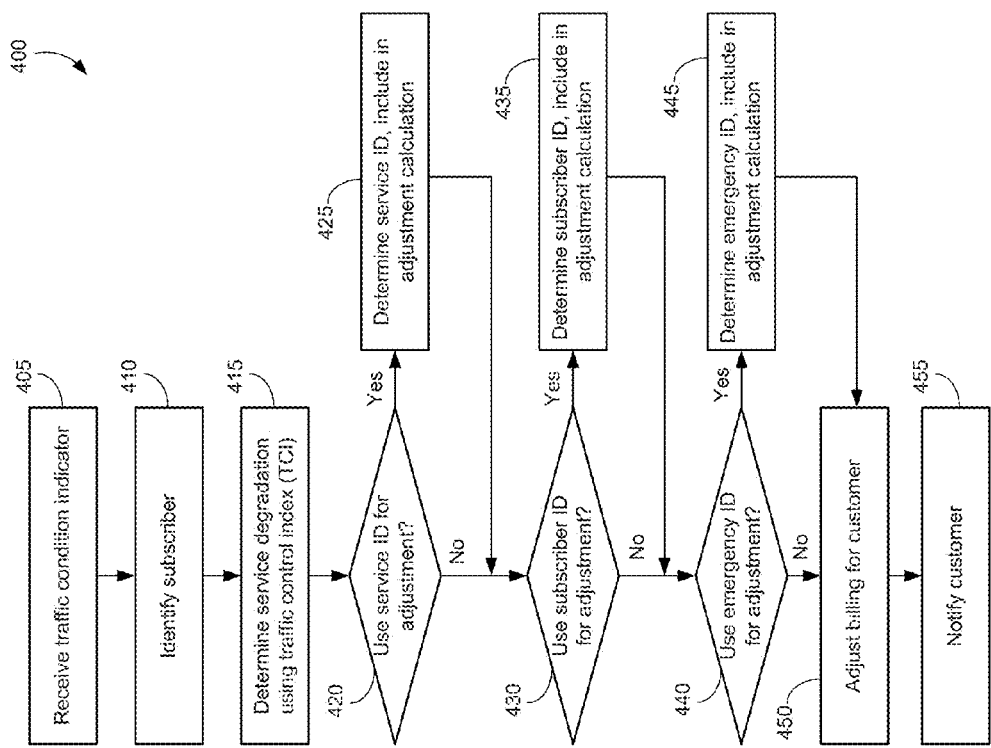
FIG. 4 illustrates another non-limiting exemplary method of implementing LTE network billing management.

FIG. 4 illustrates exemplary, non-limiting method 300 of implementing an embodiment for adjusting subscriber charging as disclosed herein. Method 400, and the individual actions and functions describing in method 400, may be performed by any one or more devices, including those described herein. Note that any of the functions and/or actions described in regard to any of the blocks of method 400 may be performed in any order, in isolation, with a subset of other functions and/or actions described in regard to any of the other blocks of method 300 or any other method described herein, and in combination with other functions and/or actions, including those described herein and those not set forth herein. All such embodiments are contemplated as within the scope of the present disclosure.

At block 405, a traffic condition indicator may be received. Such an indicator may be received at a billing server or at any other device that may adjust subscriber charging. At block 410, a subscriber may be identified based on the indicator. This may be done using a 5-tuple included in the indicator, and/or using a subscriber ID as described herein. Identifying the subscriber may allow the billing server or system to readily access and modify the proper records for eth subscriber.

At block 415, the service degradation level or character may be determined. This may be performed using a traffic control index (TCI) as discussed above. Note that this may be a determination of no service degradation, and the actions and functions described in method 400 may be used simply to provide a correct accounting for charging purposes. Alternatively, a TCI may not be used at all, and instead other means may be used to indicate congestion and/or service degradation of some type. Note that in an embodiment, an indicator may be provided for all traffic and not just for service-degraded traffic. All such embodiments are contemplated as within the scope of the present disclosure.

At block 420, a determination may be made as to whether a service ID as described herein is in use and/or present in the traffic condition indicator. Note that where no service ID is in use, no determination may be made and any of the other actions and functions described in method 400 may be used regardless. If a service ID is in use, at block 425, the service ID may be determined and included in any adjustment calculation. If no service ID is in use or if no service ID is included in the traffic condition indicator, then method 400 may proceed to block 430

At block 430, a determination may be made as to whether a subscriber ID as described herein is in use and/or present in the traffic condition indicator. Note that where no subscriber ID is in use, no determination may be made and any of the other actions and functions described in method 400 may be used regardless. If a subscriber ID is in use, at block 435, the service ID may be determined and included in any adjustment calculation. If no subscriber ID is in use or if no service ID is included in the traffic condition indicator, then method 400 may proceed to block 440.

At block 440, a determination may be made as to whether an emergency ID as described herein is in use and/or present in the traffic condition indicator. Note that where no emergency ID is in use, no determination may be made and any of the other actions and functions described in method 400 may be used regardless. If an emergency ID is in use, at block 435, the emergency ID may be determined and included in any adjustment calculation. If no emergency ID is in use, or if no emergency ID is included in the traffic condition indicator, then method 400 may proceed to block 450.

At block 450, and charging adjustments and/or billing data may be generated using one or more of the criteria described herein. This may include applying any adjustments to a bill for a subscriber and/or providing the bill to the subscriber using any means. At block 455, the subscriber may be notified of any adjustments and/or of the presence of a prepared bill.

The methods and systems described above assist in providing improved customer service, especially when network performance is affected by outages, congestions, or any other event or occurrence that may degrade service provided to a subscriber. By implementing the present disclosure, the user experience may be improved by proactively addressing and mitigating charging for service that is less than optimal. Set forth below are further exemplary systems, devices, and components in which aspects of the disclosed charging management may be implemented.

Figure 5:
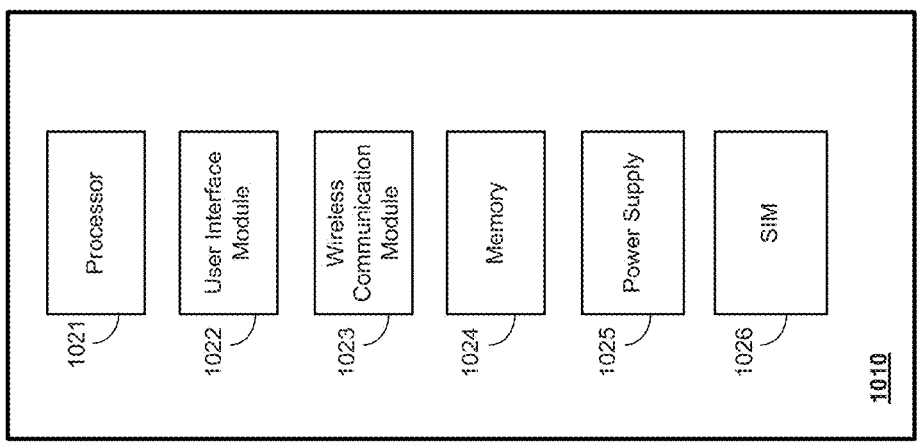
FIG. 5 is a block diagram of a non-limiting exemplary mobile device in which LTE network billing management may be implemented.

FIG. 5 illustrates an example wireless device 1010 that may be used in connection with an embodiment. References will also be made to other figures of the present disclosure as appropriate. For example, mobile devices 102 and/or 210 may be wireless devices of the type described in regard to FIG. 5, and may have some, all, or none of the components and modules described in regard to FIG. 5. It will be appreciated that the components and modules of wireless device 1010 illustrated in FIG. 5 are illustrative, and that any number and type of components and/or modules may be present in wireless device 1010. In addition, the functions performed by any or all of the components and modules illustrated in FIG. 5 may be performed by any number of physical components. Thus, it is possible that in some embodiments the functionality of more than one component and/or module illustrated in FIG. 5 may be performed by any number or types of hardware and/or software.

Processor 1021 may be any type of circuitry that performs operations on behalf of wireless device 1010. In one embodiment, processor 1021 executes software (i.e., computer-readable instructions stored on a tangible computer-readable medium) that may include functionality related to charging management, for example. User interface module 1022 may be any type or combination of hardware and/or software that enables a user to operate and interact with wireless device 1010, and, in one embodiment, to interact with a system or software enabling the user to place, request, and/or receive calls, text communications of any type, voicemail, voicemail notifications, voicemail content and/or data, charging and/or billing data, and/or a system or software enabling the user to view, modify, or delete related software objects. For example, user interface module 1022 may include a display, physical and/or "soft" keys, voice recognition software, a microphone, a speaker and the like. Wireless communication module 1023 may be any type of transceiver including any combination of hardware and/or software that enables wireless device 1010 to communicate with wireless network equipment. Memory 1024 enables wireless device 1010 to store information, such as APNs, MNCs, MCCs, text communications content and associated data, multimedia content, software to efficiently process radio resource requests and service requests, and radio resource request processing preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 6:
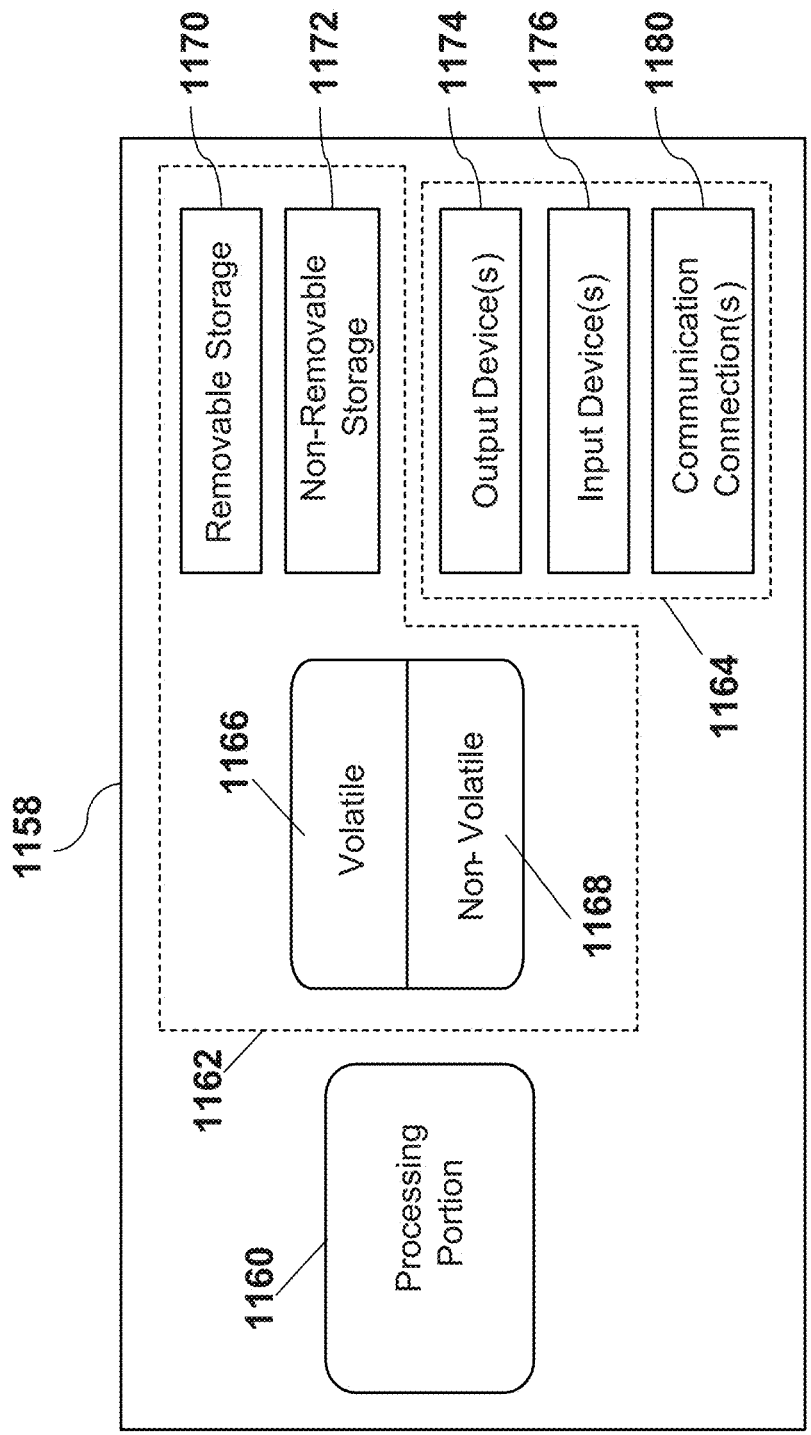
FIG. 6 is a block diagram of a non-limiting exemplary processor in which LTE network billing management may be implemented.

FIG. 6 is a block diagram of an example processor 1158 which may be employed in any of the embodiments described herein, including as one or more components of mobile devices 102 and/or 210, as one or more components of network equipment such as eNode-Bs 140, MME 142, service gateway 144, PDN gateway 146, and any of devices any of the devices 220, 230, 240, 250, 260, and 270, any other component of networks 106, 108, 110, 112, and 201, and/or any related equipment, and/or as one or more components of any third party system or subsystem that may implement any portion of the subject matter described herein. It is emphasized that the block diagram depicted in FIG. 6 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

As depicted in FIG. 6, the processor 1158 comprises a processing portion 1160, a memory portion 1162, and an input/output portion 1164. The processing portion 1160, memory portion 1162, and input/output portion 1164 are coupled together (coupling not shown in FIG. 6) to allow communications between these portions. The input/output portion 1164 is capable of providing and/or receiving components, commands, and/or instructions, utilized to, for example, request charging adjustments, transmit and receive traffic condition indicators, establish and terminate communications sessions, transmit and receive service requests and data access request data and responses, transmit, receive, store and process text, data, and voice communications, execute software that efficiently processes radio resource requests, receive and store service requests and radio resource requests, radio resource request processing preferences and configurations, and/or perform any other function described herein.

The processor 1158 may be implemented as a client processor and/or a server processor. In a basic configuration, the processor 1158 may include at least one processing portion 1160 and memory portion 1162. The memory portion 1162 can store any information utilized in conjunction with establishing, transmitting, receiving, and/or processing text, data, and/or voice communications, communications-related data and/or content, voice calls, other telephonic communications, etc. For example, the memory portion is capable of storing APNs, MNCs, MCCs, service requests, radio resource requests, QoS and/or APN parameters, software for a charging management, text and data communications, calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 may include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, may be tangible storage media that may include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the processor 1158. Any such computer storage media may be part of the processor 1158.

The processor 1158 may also contain the communications connection(s) 1180 that allow the processor 1158 to communicate with other devices, for example through a radio access network (RAN). Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein may include both storage media and communication media. The processor 1158 also may have input device(s) 1176 such as keyboard, keypad, mouse, pen, voice input device, touch input device, etc. Output device(s) 1174 such as a display, speakers, printer, etc. also may be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how charging management may be implemented with stationary and non-stationary network structures and architectures in order to manage charging. It will be appreciated, however, charging management as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), LTE-Advanced. etc., as well as to other network services that become available in time. In this regard, charging management may be implemented independently of the method of data transport and does not depend on any particular network architecture or underlying protocols.

Figure 7:
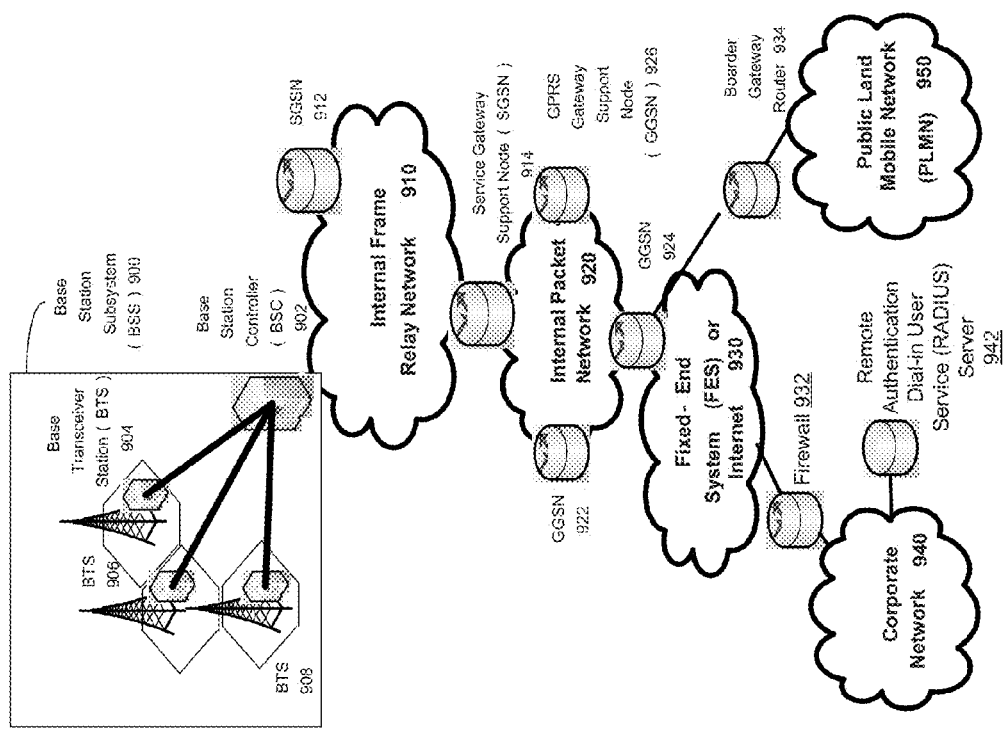
FIG. 7 is a block diagram of a non-limiting exemplary packet-based mobile cellular network environment, such as a GPRS network, in which LTE network billing management may be implemented.

FIG. 7 depicts an overall block diagram of an exemplary packet-based mobile cellular network environment, such as a GPRS network, in which charging management systems and methods such as those described herein may be practiced. In an example configuration, any RAN as described herein may be encompassed by or interact with the network environment depicted in FIG. 7. Similarly, mobile devices 102 and/or 210 may communicate or interact with a network environment such as that depicted in FIG. 7. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., mobile devices 102 and 210) become connected to the wireless network. In exemplary fashion, the packet traffic originating from user devices (e.g., mobile devices 102 and 210) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 8:
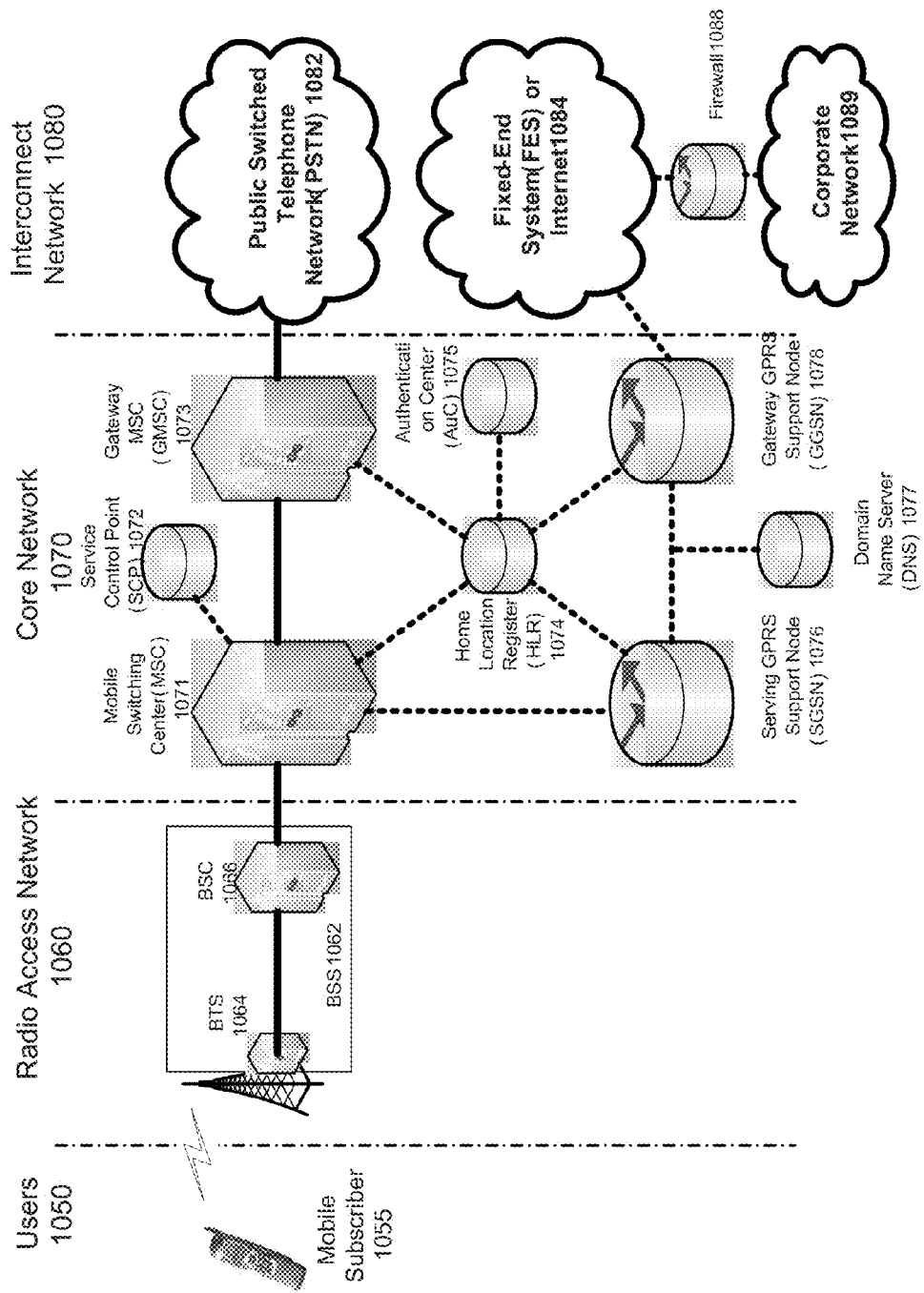
FIG. 8 illustrates a non-limiting exemplary architecture of a typical GPRS network, segmented into four groups, in which LTE network billing management may be implemented.

FIG. 8 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 8). In an example embodiment, the device depicted as mobile subscriber 1055 may comprise any of mobile devices 102 and 210. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 8, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076 that may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. In some embodiments, any of devices 220, 230, 240, 250, 260, and 270 may be a device such as HLR 1074. HLR 1074 may store static information about the subscribers such as the International Mobile Subscriber Identity (IMSI), APN profiles, subscribed services, and a key for authenticating the subscriber. HLR 1074 may also store dynamic subscriber information such as dynamic APN profiles and the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as mobile devices 102 and 210, used by an end user of a mobile cellular service or a wireless provider. When a mobile subscriber turns on his or her mobile device, the mobile device may go through an attach process by which the mobile device attaches to an SGSN of the GPRS network. In FIG. 8, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076.

HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself to the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to an Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, that may be provisioned to map to one or more GGSN nodes in the core network 1070. Based on the APN, the mapped GGSN 1078 may access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of charging management systems and methods such as those described herein may include, but are not limited to, Gateway GPRS Support Node tables, Fixed End System router tables, firewall systems, VPN tunnels, and any number of other network elements as required by the particular digital network.

Figure 9:
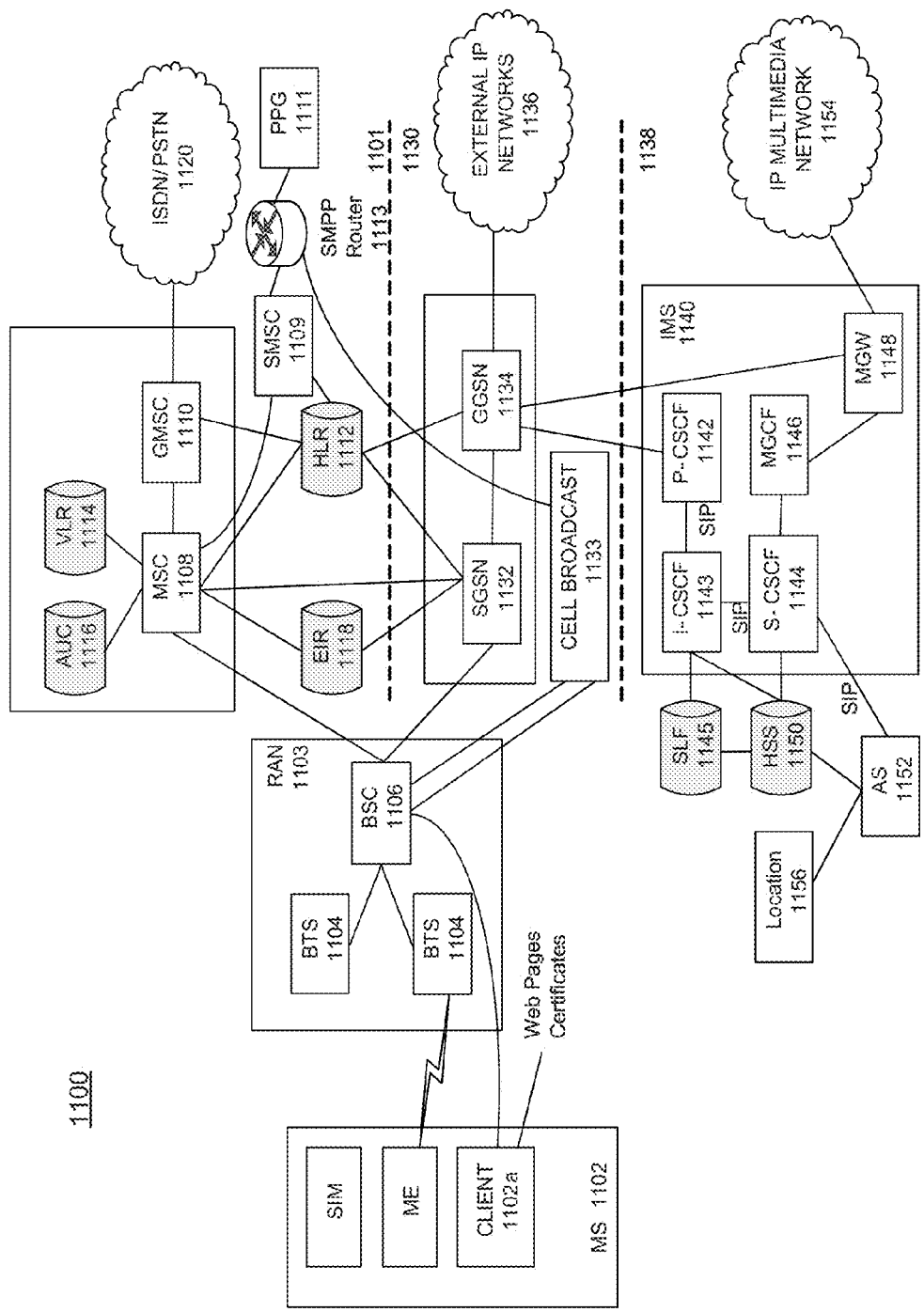
FIG. 9 illustrates a non-limiting alternate block diagram of an exemplary GSM/GPRS/IP multimedia network architecture in which LTE network billing management may be implemented.

FIG. 9 illustrates another exemplary block diagram view of a GSM/GPRS/IP multimedia network architecture 1100 in which the systems and methods for charging management such as those described herein may be incorporated. As illustrated, architecture 1100 of FIG. 9 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., mobile devices 102 and/or 210) that is used by mobile subscribers, in one embodiment with a Subscriber identity Module (SIM). The SIM may include an International Mobile Subscriber Identity (IMSI), which may be a unique identifier of a subscriber. The SIM may also include APNs.

The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that may contain administrative information regarding each subscriber registered in a corresponding GSM network. Such information may include APNs and APN profiles. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS may then activate a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct an MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS may be receiving data and may not be listening to a paging channel. In a NOM3 network, a MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision may be based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

While example embodiments of systems and methods for charging management have been described in connection with various communications devices and computing devices and processors, the underlying concepts can be applied to any communications or computing device, processor, or system capable of implementing the charging management systems and methods described. The various techniques described herein may be implemented in connection with hardware or software or, where appropriate, with a combination of both. Thus, the methods and apparatuses for charging management, or certain aspects or portions thereof, can take the form of program code (i.e., instructions) embodied in tangible and/or non-transitory media, such as floppy diskettes, CD-ROMs, hard drives, or any other machine-readable storage medium, wherein, when the program code is loaded into and executed by a machine, such as a computer, the machine becomes an apparatus for charging management. In the case of program code execution on programmable computers, the computing device may include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

Methods and systems for charging management may also be practiced via communications embodied in the form of program code that is transmitted over some transmission medium, such as over electrical wiring or cabling, through fiber optics, or via any other form of transmission, wherein, when the program code is received, loaded into, and executed by a machine, such as an EPROM, a gate array, a programmable logic device (PLD), a client computer, or the like, the machine becomes an apparatus for charging management. When implemented on a general-purpose processor, the program code combines with the processor to provide a unique apparatus that operates to invoke the functionality of charging management as described herein. Additionally, any storage techniques used in connection with a charging management system may invariably be a combination of hardware and software.

While charging management systems and methods have been described in connection with the various embodiments of the various figures, it is to be understood that other similar embodiments may be used or modifications and additions may be made to the described embodiments for performing the same function of charging management without deviating therefrom. For example, one skilled in the art will recognize charging management as described in the present application may apply to any environment, whether wired or wireless, and may be applied to any number of such devices connected via a communications network and interacting across the network. Therefore, charging management should not be limited to any single embodiment, but rather should be construed in breadth and scope in accordance with the appended claims.

What is claimed is:

1. A method comprising:
monitoring, at a network device, a traffic flow comprising communications data on a long term evolution network;
determining, at the network device, that a network condition has created an effect on the traffic flow;
determining, at the network device, a characteristic of the effect, the characteristic of the effect comprising a degradation of the traffic flow;
determining, based on a 5-tuple associated with the traffic flow, at the network device, a subscriber associated with the traffic flow and a subscriber identifier, wherein the subscriber identifier changes based on a priority of the traffic flow;
determining a first priority level of the subscriber from a plurality of priority levels;
responsive to determining the subscriber associated with the traffic flow, generating a second amount to credit a bill of the subscriber for the traffic flow, wherein the amount to credit associated with the traffic flow is an increase of a first amount, wherein the increase is based on the number of instances of degradation of traffic flows for the subscriber and a severity of degradation of each instance of degradation of traffic flows; and
adjusting, at the network device, billing for the subscriber based on:
the characteristic of the effect,
the second amount to credit the bill of the subscriber for the traffic flow, and
the first priority level of the subscriber.

2. The method of claim 1, wherein the determining of the characteristic of the effect comprises assigning a ranking for the effect from a spectrum of service degradation categories.

3. The method of claim 2, wherein the adjusting of the billing for the subscriber comprises determining a billing adjustment based on the ranking.

4. The method of claim 1, further comprising transmitting a notification of a billing adjustment to the subscriber.

5. The method of claim 1, wherein the determining of the subscriber associated with the traffic flow comprises obtaining data from a packet within the traffic flow and determining the subscriber based on the data.

6. The method of claim 5, wherein the data comprises a subscriber identifier.

7. The method of claim 1, further comprising adjusting billing based on an urgency associated with the traffic flow.

8. A network device comprising:
a processor; and
memory coupled to the processor, the memory comprising executable instructions that when executed by the processor cause the processor to effectuation operations comprising:
monitoring a traffic flow comprising communications data on a long term evolution network;
determining that a network condition has created an effect on the traffic flow, the characteristic of the effect comprising a degradation of the traffic flow and a subscriber identifier, wherein the subscriber identifier changes based on a priority of the traffic flow;
determining a characteristic of the effect;
determining a subscriber associated with the traffic flow;
determining a first priority level of the subscriber from a plurality of priority levels;
responsive to determining the subscriber associated with the traffic flow, generating a second amount to credit a bill of the subscriber for the traffic flow, wherein the amount to credit associated with the traffic flow is an increase of a first amount, wherein the increase is based on the number of instances of degradation of traffic flows for the subscriber and a severity of degradation of each instance of degradation of traffic flows; and
adjusting billing for the subscriber based on the characteristic of the effect, the first priority level of the subscriber, the second amount to credit the bill of the subscriber for the traffic flow, and an emergency status associated with the traffic flow.

9. The network device of claim 8, the operations further comprising:
determine a service identifier for the traffic flow, wherein the service identifier comprises an indication of a type of service being provided by the traffic flow; and
adjust the billing for the subscriber based on the characteristic of the effect and the service identifier.

10. The network device of claim 8, the operations further comprising:
- determining a subscriber identifier for the traffic flow, wherein the subscriber identifier comprises an indication of the subscriber associated with the traffic flow; and
- adjusting the billing for the subscriber based on the characteristic of the effect and the subscriber identifier.

11. The network device of claim 8, the operations further comprising:
- determining an emergency identifier for the traffic flow, wherein the emergency identifier comprises an indication of the emergency status of a service being provided by the traffic flow; and
- adjusting the billing for the subscriber based on the characteristic of the effect and the emergency identifier.

12. The network device of claim 8, the operations further comprising:
- determining a traffic condition index for the traffic flow, wherein the traffic condition index comprises an indication of the effect; and
- adjusting the billing for the subscriber based on the traffic condition index.

13. The network device of claim 12, the operations further comprising assigning a ranking for the traffic condition index from a spectrum of service degradation categories.

14. The network device of claim 8, the operations further comprising transmitting a notification of a billing adjustment to the subscriber.

15. A tangible computer-readable storage medium that is not a propagating signal, the computer-readable storage medium comprising computer-executable instructions, which when executed by a processor, cause the processor to effectuate operations comprising:
- monitoring a traffic flow comprising communications data on a long term evolution network;
- determining that a network condition has created an effect on the traffic flow;
- determining a characteristic of the effect, the characteristic of the effect comprising a degradation of the traffic flow and a subscriber identifier, wherein the subscriber identifier changes based on a priority of the traffic flow;
- determining a subscriber associated with the traffic flow;
- determining a first priority level of the subscriber from a plurality of priority levels;
- responsive to determining the subscriber associated with the traffic flow, generating a second amount to credit a bill of the subscriber for the traffic flow, wherein the amount to credit associated with the traffic flow is an increase of a first amount, wherein the increase is based on the number of instances of degradation of traffic flows for the subscriber and a severity of degradation of each instance of degradation of traffic flows; and
- adjusting billing for the subscriber based on the characteristic of the effect, the first priority level of the subscriber, the second amount to credit the bill of the subscriber for the traffic flow, and an emergency status associated with the traffic flow.

16. The tangible computer-readable storage medium of claim 15, wherein the operations further comprise:
- determining a service identifier for the traffic flow, wherein the service identifier comprises an indication of a type of service being provided by the traffic flow; and
- adjusting the billing for the subscriber based on the characteristic of the effect and the service identifier.

17. The tangible computer-readable storage medium of claim 15, wherein the operations further comprise:
- determining a subscriber identifier for the traffic flow, wherein the subscriber identifier comprises an indication of the subscriber associated with the traffic flow; and
- adjusting the billing for the subscriber based on the characteristic of the effect and the subscriber identifier.

18. The tangible computer-readable storage medium of claim 15, wherein the operations further comprise:
- determining an emergency identifier for the traffic flow, wherein the emergency identifier comprises an indication of the emergency status of a service being provided by the traffic flow; and
- adjusting the billing for the subscriber based on the characteristic of the effect and the emergency identifier.

19. The tangible computer-readable storage medium of claim 15, wherein the operations further comprise:
- determining a traffic condition index for the traffic flow, wherein the traffic condition index comprises an indication of the adverse effect; and
- adjusting the billing for the subscriber based on the traffic condition index.

20. The tangible computer-readable storage medium of claim 15, wherein the operations further comprise transmitting a notification of a billing adjustment to the subscriber.

* * * * *